CODE TRANSLATING SYSTEM

Filed Sept. 12, 1963 6 Sheets-Sheet 1

INVENTORS
ROBERT C. KULL
ROBERT W. DELL
GEORGE E. BOYLE, JR.
BY Jack M. Wiseman
ATTORNEY INVENTORS
ROBERT C. KULL
ROBERT W. DELL
GEORGE E. BOYLE, JR
BY Jack M. Wiseman
ATTORNEY INVENTORS
ROBERT C. KULL
ROBERT W. DELL
GEORGE E. BOYLE, JR.
BY Jack M. Wiseman
ATTORNEY INVENTORS
ROBERT C. KULL
ROBERT W. DELL
GEORGE E. BOYLE, JR.
BY Jack M. Wiseman
ATTORNEY

CODE TRANSLATING SYSTEM

Filed Sept. 12, 1963 6 Sheets-Sheet 5

INVENTORS
ROBERT C. KULL
ROBERT W. DELL
GEORGE E. BOYLE, JR.

BY Jack M. Wiseman
ATTORNEY

INVENTORS
ROBERT C. KULL
ROBERT W. DELL
GEORGE E. BOYLE, JR.
BY Jack M. Wiseman
ATTORNEY United States Patent Office 3,312,944

Patented Apr. 4, 1967

3,312,944

CODE TRANSLATING SYSTEM

Robert C. Kull, 2317 Lynn Oaks Drive, and Robert W. Dell, 3457 Williams Road, both of San Jose, Calif. 95117, and George E. Boyle, Jr., 2533 Johnson Place, Santa Clara, Calif. 95050, assignors of twenty-five percent to Robert F. Webb, Santa Clara, Calif.

Filed Sept. 12, 1963, Ser. No. 308,452
18 Claims. (Cl. 340—172.5)

The present invention relates in general to code translating systems, and more particularly to a code translating system for producing printed copy from a phonetic code tape.

An object of the present invention is to provide an improved code translating system for producing printed copy from a phonetic code tape.

Another object of the present invention is to provide a code translating system for producing printed copy from a phonetic code tape at a rapid speed without sacrificing accuracy.

Another object of the present invention is to provide a code translating system for producing printed copy from a phonetic code tape without destroying, mutilating, or altering the phonetic code tape.

Another object of the present invention is to provide a code translating system for producing printed copy from a phonetic code tape and in which the operator producing the phonetic code tape employs equipment that is not cumbersome, that is portable, and that requires a minimum quantity of units.

Another object of the present invention is to provide a code translating system for producing printed copy from a phonetic code tape and in which the device for producing the phonetic code characters on the tape is generally conventional and does not require substantial modifications or changes.

Other and further objects and advantages of the present invention will be apparent to one skilled in the art from the following description taken in conjunction with the accompanying drawings, in which:

FIG. 1 is a block diagram of the code translating system of the present invention.

FIGS. 2–4, when arranged in the manner shown in FIG. 5, are a schematic diagram of the code translating system of the present invention.

Figure 1:
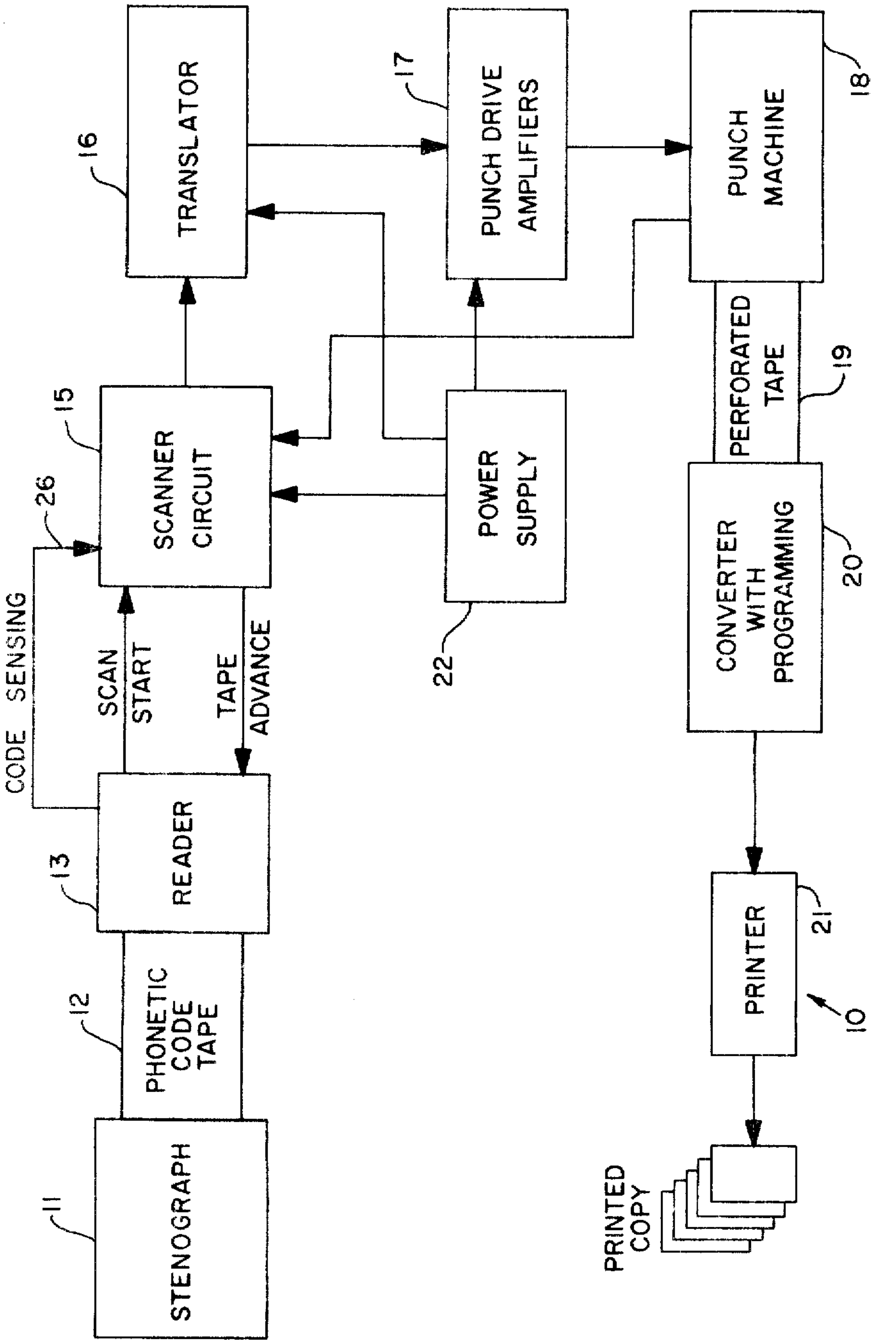

Illustrated in FIG. 1 is the code translating system 10 of the present invention which employs a substantially conventional keyboard stenograph 11 of the type generally and usually used by court reporters. By using the stenograph 11, an operator will print onto a tape 12 a phonetic code. The tape 12 with the phonetic code printed and recorded thereon is substantially the same coded tape that results from the use of the substantially conventional stenograph by a court reporter.

For transcribing the recorded intelligence on the tape 12 to produce printed copy therefrom, an operator places the tape 12 in a reader or a code sensing device 13. The reader 13 reacts to the intelligence on the line-by-line advancing tape 12 and feeds to a scanning circuit 15 voltage signals representative of the coded information sensed from the tape 12.

In turn, the scanning circuit 15 feeds voltage signals representative of the coded information sensed from the tape 12 to a translator 16 in the same sequence and in the same order that the coded intelligence is printed onto the tape 12 by the stenograph 11. The translator 16 in response to the voltage signals fed by the scanning circuit 16 causes the activation of the punch drive amplifiers 17, which in turn control the operation of a punch machine 18 to produce coded perforations in a tape 19.

In effect, the translator 16 responds to the voltage signals representative of the coded information sensed from the tape 12 and translates the same into a code compatible with a converter 20. This is accomplished through the operation of the punch machine 18, which produces coded perforations into the tape 19 recognizable and useable by the converter 20. The converter 20 controls the operation of a printer 21 for producing printed copies of readable and complete words and sentences transcribed from the phonetic intelligence appearing on the tape 12. A suitable Zener regulated power supply 22 provides the required direct current voltages for the scanner circuit 15, translator 16 and punch drive amplifier 17.

As previously discussed, the stenograph 11 (FIGS. 1 and 2) prints onto the tape 12 (FIG. 6) a phonetic code. Phonetic codes employ a single letter to represent a word or name or may employ in phrasing a group of letters to represent a long word or two or more words in frequently used combinations or phrases. In this manner, the letters form an abbreviation for the spelling of words, names or phrases to increase the recording speed. Of course, other characters and symbols may be used equally as well in a code.

Figure 6:
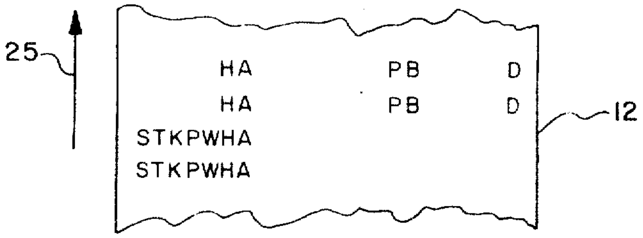
FIG. 6 is a plan view of a tape having a phonetic code intelligence printed thereon and adaptable for use in the code translating system of the present invention.

Only one letter as in the case of a phonetic code or only one group of letters as in the case of phrasing will appear in a single horizontal row or line on the tape 12 (FIG. 6). Thus, each horizontal line on the tape 12 will symbolically show a word as in the case of a phonetic code or a group of words as in the case of phrasing. Accordingly, each horizontal line in the present system represents one cycle of operation for the code translating system 10 of the present invention.

The same character will always appear on the tape 12 the same transverse distances from the edges of the tape 12. Stated otherwise, all letters "H" on the tape 12 will be in vertical alignment. Likewise, all asterisk symbols on the tape 12 will be in vertical alignment.

In a phonetic code for court reporting, there are twenty-two characters, namely: 1 or S, 2 or T, K, 3 or P, W, 4 or H, R, 5 or A, O, *, E, U, 6 or F, R, 7 or P, B, 8 or L, G, 9 or T, S, D, S, which always appear in the present system from left to right as viewed by an operator and as viewed in FIG. 6. Where a combination of a letter and number appears for a single character, either a letter or a number will be printed on the tape depending on the position of a tab bar for the stenograph 11. Therefore, each horizontal line for the tape 12 is capable of having printed therein all of the above characters. Hence, any of the above characters are capable of appearing on the tape 12 during any one cycle of operation. In addition, the present invention provides for two editing marks, namely: stars as the first and last characters.

Thus, the tape 12 with the phonetic code printed and recorded thereon is substantially the same coded tape that results from the substantially conventional stenograph used by court reporters. It is to be observed that the phonetic code letters and symbols are printed onto the tape 12 and do not appear therein as perforations or punch holes.

Figure 2:
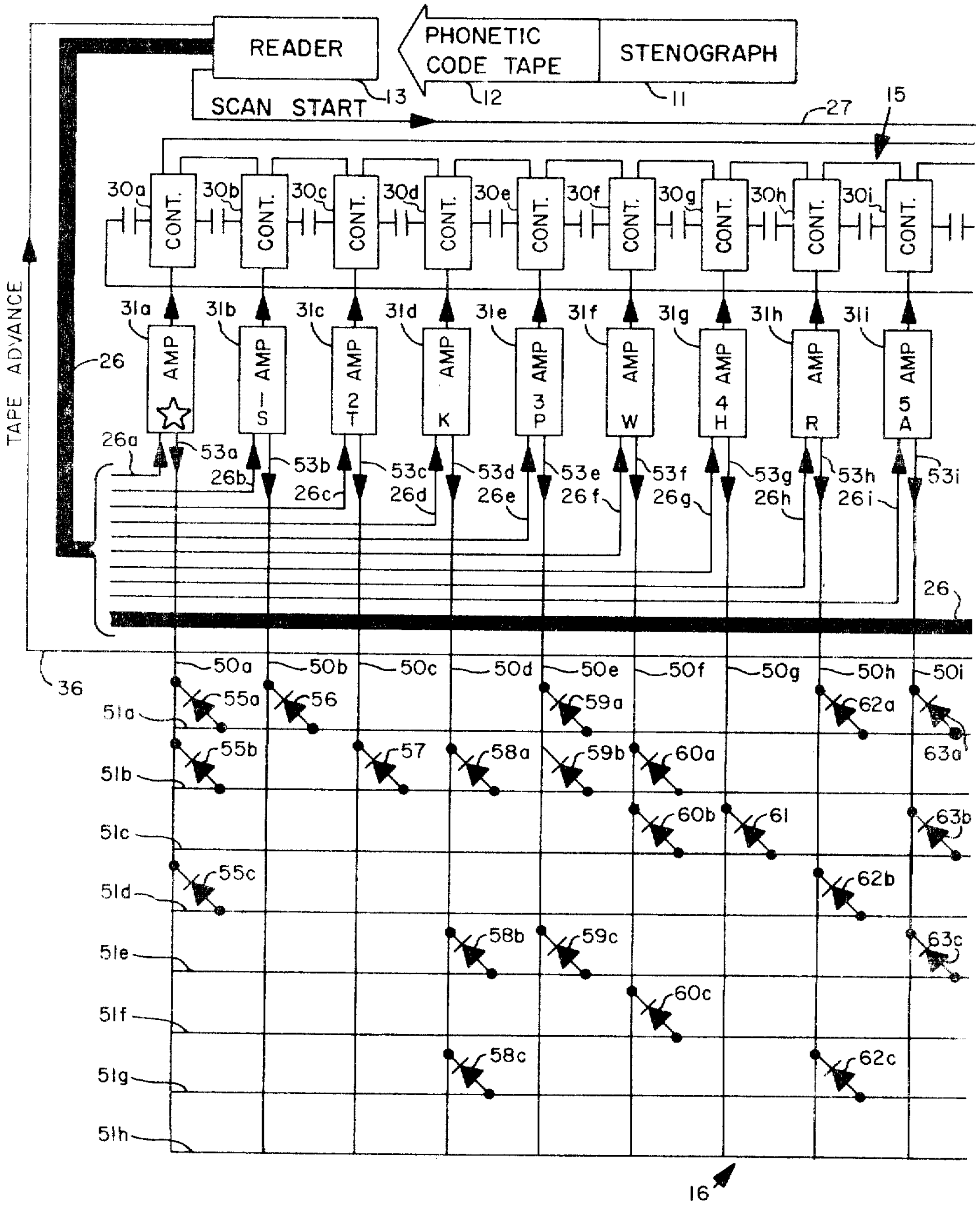

When an operator desires to produce printed copy of completely spelled words and fully formed sentences that are transcribed from the phonetic code intelligence appearing on the tape 12, he places the tape 12 in the reader or the code sensing device 13 (FIGS. 1 and 2). The tape 12 is arranged to advance within the reader 13 in a line-by-line sequence with the first printed line appearing first in the reader 13. Thereafter, the tape 12 is advanced line-by-line through the reader 13 in the same order and in the same sequence as the phonetic code intelligence is recorded on the tape 12. In the code translating system 10 of the present invention, each horizontal line or row represents one cycle of operation. The tape 12 travels step-by-step in a direction shown in FIG. 6 by an arrow 25, which is perpendicular to the printed horizontal rows or lines of the tape 12.

In the preferred embodiment of the present invention, the reader 13 (FIGS. 1 and 2) is a conventional photoelectric reader of the type manufactured by Farrington Electronics Inc. with the exception that twenty-four horizontally aligned photocells (not shown) appear in the reader. Hence, the reader 13 includes twenty-four photocells (not shown) that are arranged transversely relative to the direction of travel of the tape 12 and are spaced transversely relative to one another in fixed positions to detect the presence or absence of characters.

As previously discussed, twenty-four characters are employed in the phonetic code of the present system. Each character is located a fixed transverse distance from either edge of the tape 12. The same character appearing in different horizontal rows will appear in vertical alignment. Thus, each photocell of the reader 13 is located to sense or detect the presence or absence during each cycle of operation of a predetermined character. For example, one photocell is located to detect the presence or absence of the character "H." Another photocell is located to detect the presence or absence of the character "A."

While the preferred embodiment may refer to a printed code and photocells, it is apparent that a stenograph could record by other positively deposited type mediums and the reader could be a sensing device suitable for the selected medium.

The conventional reader, such as the one manufactured by Farrington Electronics Inc., includes suitable units for stepping the coded tape in a line-by-line sequence.

During each cycle of operation of the code translating system 10 and for each horizontal row of recorded phonetic characters on the tape 12, the photocells (not shown) in the reader 13 (FIG. 2) operate simultaneously. Hence, twenty-four output signals from the reader 13 are produced during each cycle of operation and for each horizontal line on the tape 12.

The output signal from each photocell in the reader 13 during each cycle is either a first voltage or a second voltage depending upon whether the photocell detects the presence or absence of its associated character. In the preferred embodiment of the present invention, the photocell has a ground potential or a zero voltage output when the presence of a character is sensed and has a negative potential or a −12 volt output when the absence of a character is sensed.

Considering FIGS. 2–4 and 6 for a specific example, the photocells for sensing the characters H, A, PB, D of the reader 13, which appear from left to right as viewed from FIG. 6, will have, respectively, a zero volt output during the first cycle of operation. The remaining photocells of the reader 13 will have, respectively, a −12 volt output during the first cycle of operation. Thus, the reader 13 during each cycle of operation produces twenty-four voltage signals that are representative of the intelligence on the tape 12 for a particular horizontal line. The reader 13 continues to sense a particular horizontal line until operated for stepping the tape 12, whereby the succeeding line of tape 12 is sensed. The operation for stepping tape 12 line-by-line will be described in detail hereinafter.

The output of the reader 13, which includes twenty-four voltage signals representative of the coded intelligence sensed from the tape 12, is transmitted simultaneously to the scanning circuit 15 over conductors **26*a*–26*x*, respectively, of a cable 26. In addition, the reader 13 will produce an output signal indicating that it has stepped the tape 12 to the succeeding line and transmits this output signal over a conductor 27 to the scanning circuit 15**.

Figure 3:
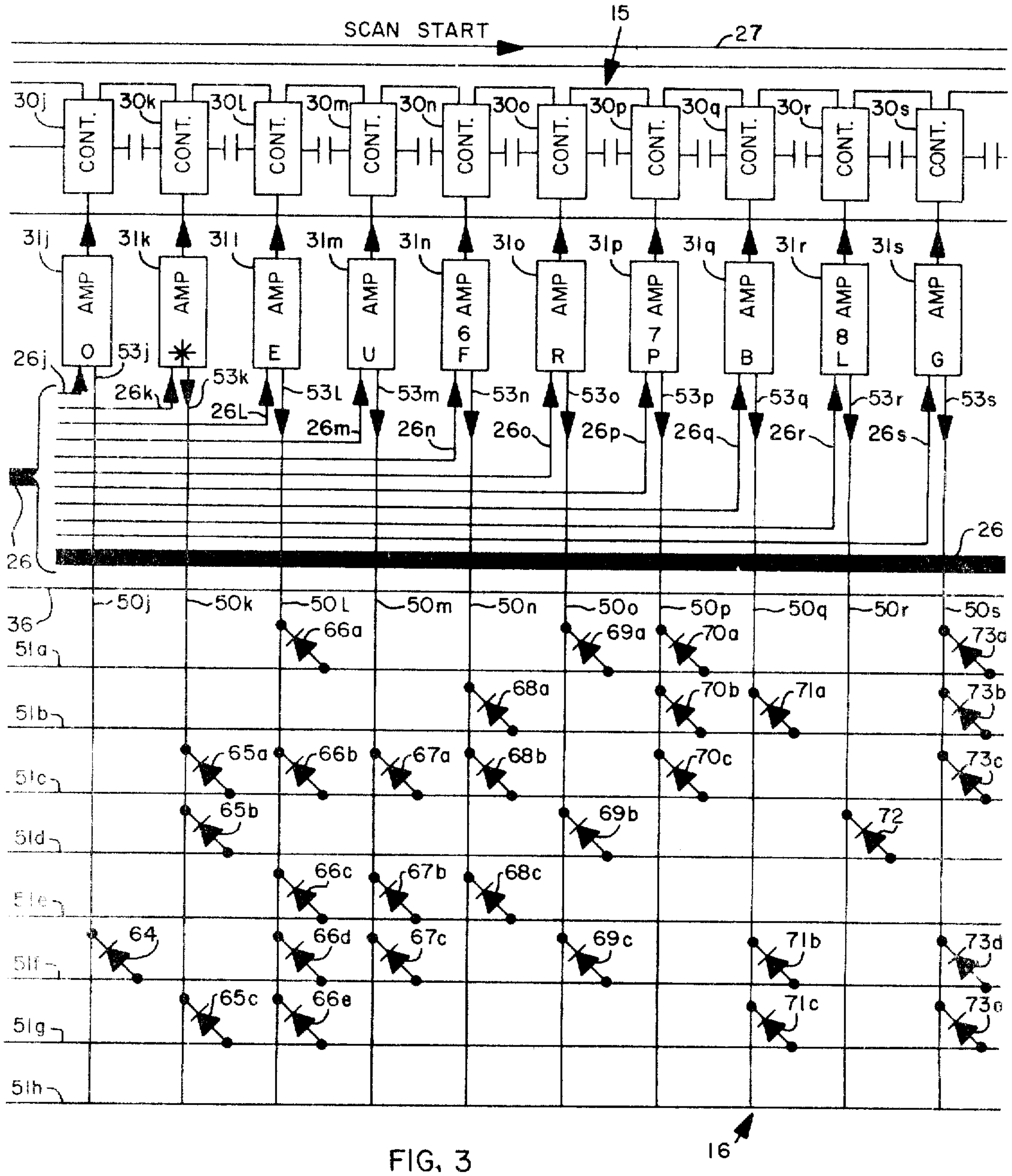
Figures 4, 5:
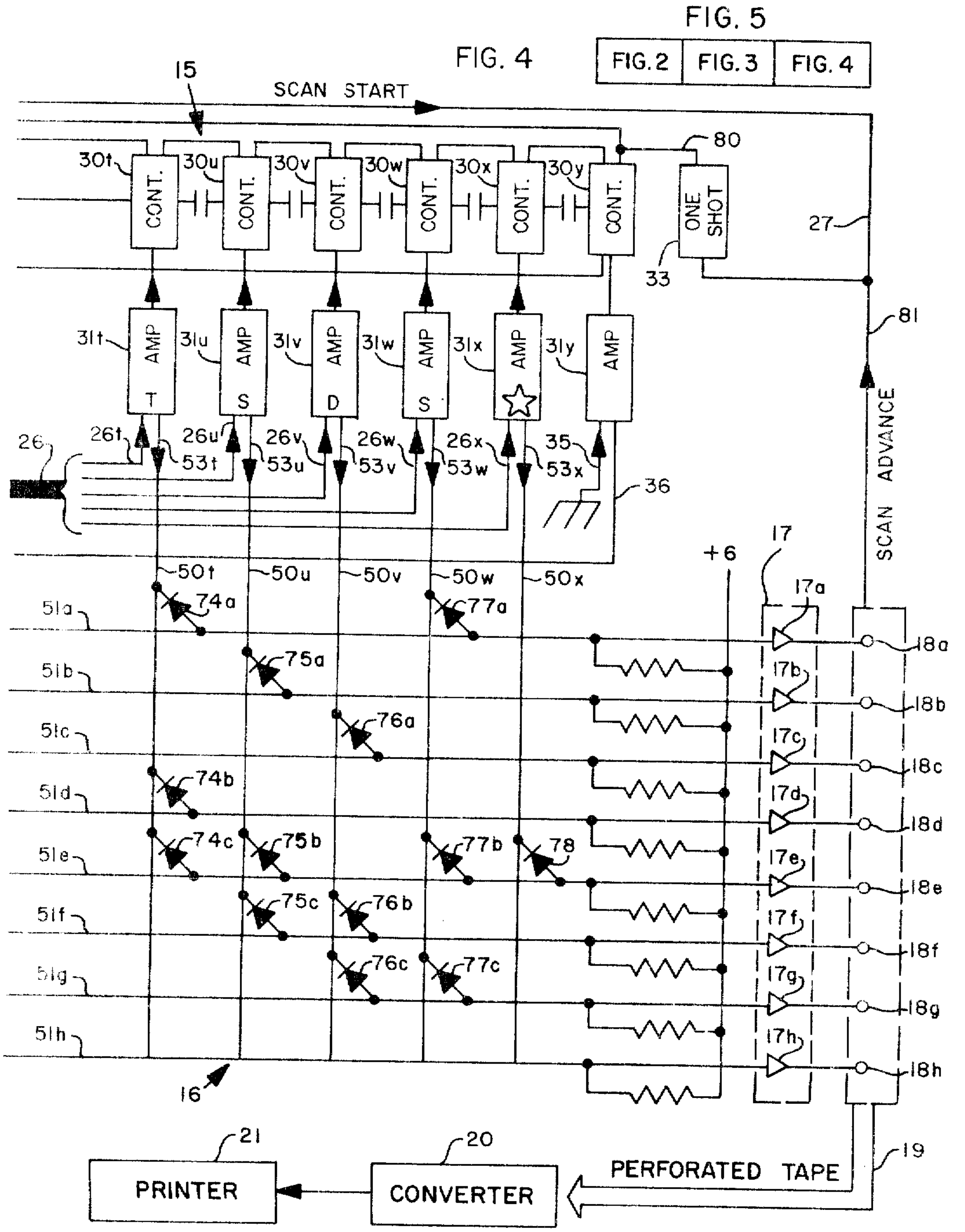
Figure 8:
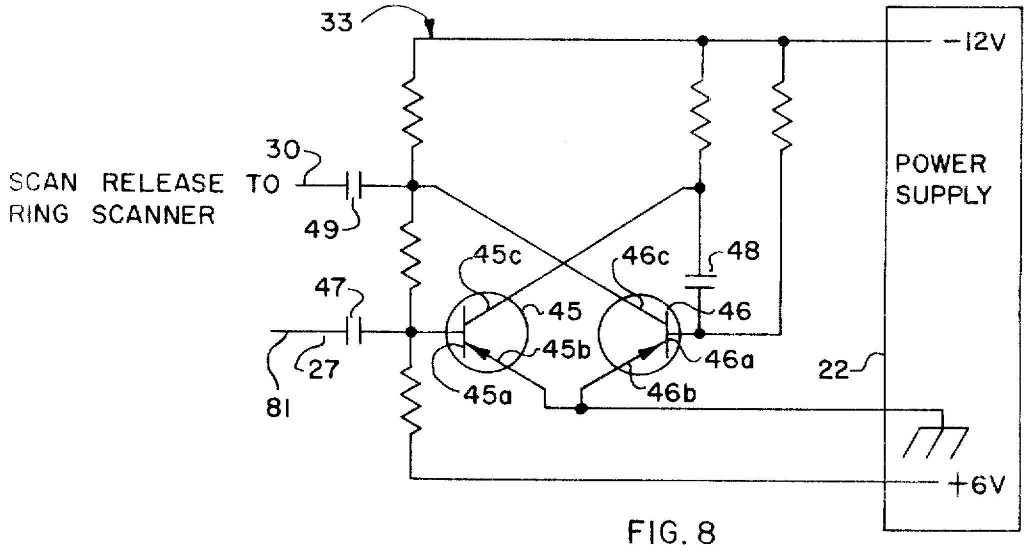
FIG. 8 is a schematic diagram of a one-shot multivibrator circuit for the scanning circuit of the present invention.

As shown in FIGS. 2–4, the scanning circuit 15 comprises a ring counter circuit, which includes twenty-four separate, but similar, stages **30*a*–30*y*. The stage 30*a* is shown in detail in FIG. 7. In addition, the scanning circuit 15 includes twenty-four separate, but similar, amplifiers 31*a*–31*y*, which are connected to and operatively controlled by the ring counter stages 30*a*–30*y*, respectively. The amplifier 31*a* is shown in detail in FIG. 7. Also the scanning circuit 15 includes a one-shot multivibrator circuit 33** (FIG. 8).

The amplifiers **31*a*–31*y* are operatively associated with the ring counter stages 30*a*–30*y* and are also associated respectively with predetermined phonetic code characters, which were previously described in detail. As observed from FIGS. 2–4, the amplifiers 31*a*–31*x***, respectively, from left to right are associated with and represent the characters *, 1 or S, T, K, . . . D, S, *. The sequence and order for the phoetic code characters and the amplifiers **31*a*–31*x* are correlated with the order and sequence for the characters on the keyboard of the stenograph 11 and are correlated with the order and sequence that the characters are capable of appearing in a horizontal line on the tape 12** from left to right as viewed in FIG. 6.

Each amplifier is representative of a predetermined character and is operative to transmit a voltage signal to the translator 16 (FIGS. 2–4) representative of the presence of its predetermined associated character. This action occurs when the reader 13 senses the presence of its associated character and impresses on the input circuit thereof a ground or zero potential and when its associated ring counter stage becomes conductive.

During each cycle of operation of the present system, the reader 13 reacts to the intelligence on the tape 12 and transmits simultaneously twenty-four signal voltages over the conductors **26*a*–26*x*, respectively, to the input of the amplifiers 31*a*–31*x*, respectively. The presence of a character causes the reader 13** to impress on the associated conductor a ground or zero potential. The absence of a character permits the voltage on the associated conductor to remain negative or at a −12 volts.

The ring counter circuit 30, which includes the stages **30*a*–30*y*, is a free running circuit. The stages 30*a*–30*y* will be conductive one at a time and in succession from left to right as viewed in FIGS. 2–4. The resistance-capacitance timing networks of the ring counter circuit 30 are arranged so that the stages 30*a*–30*y* are rendered conductive in succession and one at a time at the rate of 5,000 times per second. The ring counter circuit 30 remains free running until it encounters an amplifier with a ground potential applied to the input conductor thereof. When a grounded amplifier input circuit is encountered, the ring counter circuit 30** stops and is no longer free running until reset.

While there are only twenty-four characters in the phonetic code of the present system, there are twenty-five amplifiers and twenty-five ring counter stages. The amplifier **31*y* (FIG. 4) is a cycle starting amplifier for the scanning circuit 15 and has a fixed ground connected to the input thereof over a conductor 35 in lieu of a connection to the reader 13 through the cable 26. Connected to the amplifier 31*y* is the ring counter stage 30*y* of the ring counter circuit 30**.

The one-shot multivibrator circuit 33 (FIGS. 4 and 8) of the scanning circuit 30 is connected to the punch machine 18, the reader 13 over the conductor 27, and the ring counter stage **30*y***.

The stages 30a–30x of the ring counter circuit 30 (FIGS. 2–4) control the operation of the amplifiers 31a–31x, respectively, so that the amplifiers 31a–31x transmit to the translator 16 signals representative of the presence of characters or representative of the coded intelligence on the tape 12 in the same order and in the same sequence as the characters are printed on the tape 12. The transmission to the translator 16 occurs when a ring counter stage is conductive and its associated amplifier has a ground potential impressed on the input circuit thereof.

Assuming initially that the reader 13 senses a blank line without any character printed thereon. In such a case, a negative voltage, such as a −12 volts appears on the conductors 26a–26x, respectively, and on the input circuits of the amplifiers 31a–31x, respectively. A positive or ground potential, such as zero volts, appears on the conductor 35 (FIG. 4), which is a fixed ground potential and which is connected to the input of the cycle starting amplifier 31y.

The ring counter stages 30a–30x will conduct one at a time and in succession at the rate of 5,000 times per second until the grounded amplifier is encountered, which is the amplifier 31y (FIG. 4). When the grounded amplifier 31y is encountered, the ring counter circuit 30 stops running and the ring counter stage 30y remains conductive. This action causes the amplifier 31y to transmit a pulse to the reader 13 (FIG. 2) over a conductor 36 to cause the reader 13 to advance the tape 12 to the succeeding horizontal line. The reader 13 in turn transmits a pulse to the one-shot multivibrator circuit 33 (FIG. 4) over the conductor 27 to cause the one-shot multivibrator circuit 33 to reset the ring counter stage 30y, whereby the ring counter circuit 30 is once again free running. At this time, a new cycle has commenced.

Assuming now that the reader 13 detects the presence of the character H in the first horizontal line of the tape 12. Accordingly, the reader 13 impresses zero volts on the conductor 26g and on the input circuit of the amplifier 31g. Appearing on the conductors 26a–26f and the input circuits of the amplifiers 31a–31f, respectively, is a negative potential of a −12 volts.

The ring counter circuit 30 will, therefore, free run from the amplifier 31y and successively through the amplifiers 31a–31f. However, the ring counter circuit 30 will stop when the grounded input amplifier 31g is encountered and the ring counter stage 30g will remain conductive. As a consequence thereof, the amplifier 31g transmits a voltage signal to the code translator 16 representative of the character H. In a manner to be described hereinafter, in connection with the one-shot multivibrator 33, a pulse is produced by the punch machine 18 to begin the free running operation of the ring counter circuit 30, which will free run continuously until the ring counter circuit 30 again encounters an amplifier with a grounded input circuit.

Figure 7:
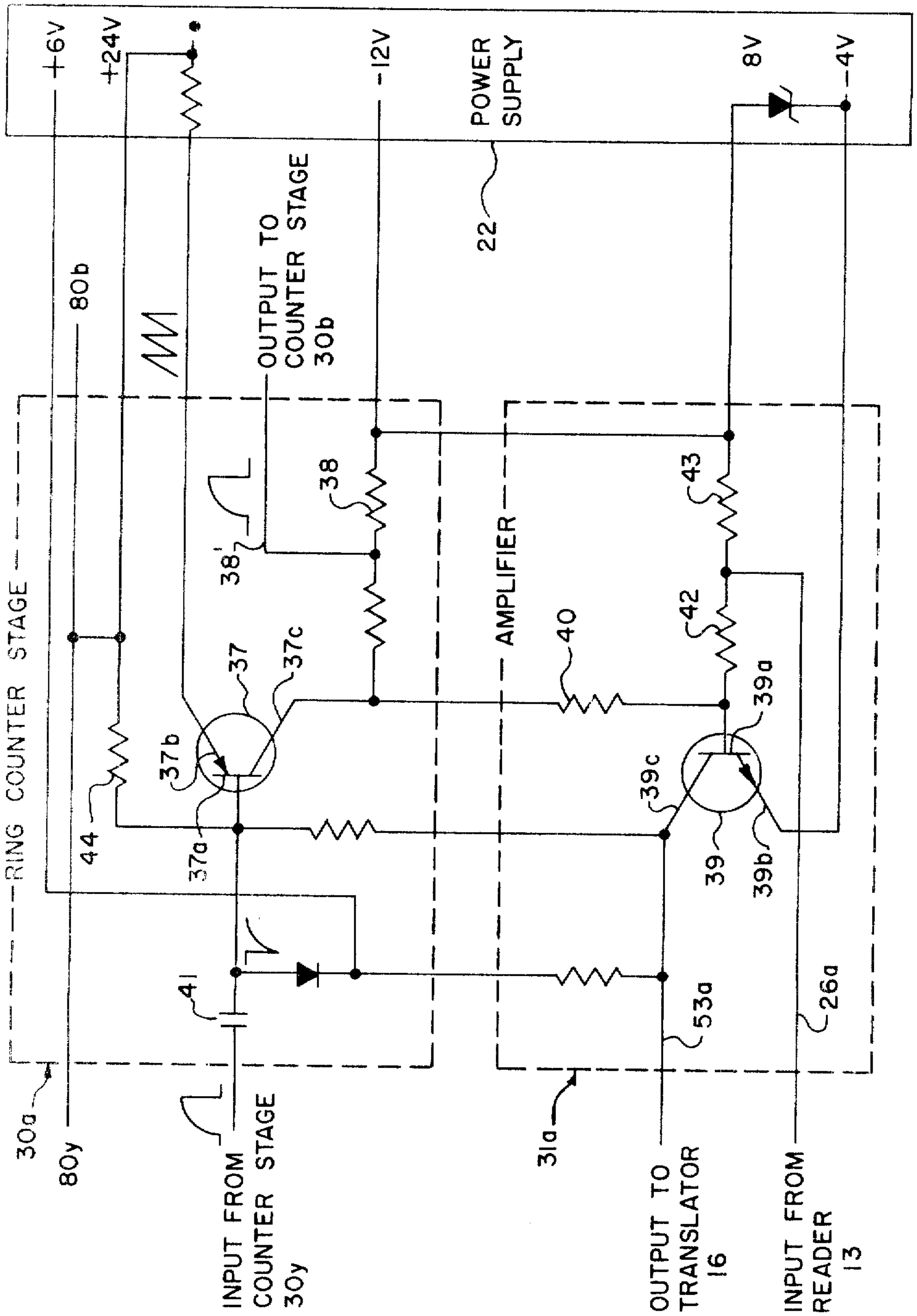
FIG. 7 is a schematic diagram of one stage of a scanning circuit employed in the code translating system of the present invention.

Illustrated in FIG. 7 is the ring counter stage 30a of the ring counter circuit 30 and the amplifier 31a associated with the ring counter stage 30a. The stages 30b–30x of the ring counter circuit 30 and the amplifiers 31b–31x are similar in structure and operation to the stage 30a and the amplifier 31a, respectively. Hence, the ring counter stages 30b–30x and the amplifiers 31b–31x will not be described in detail herein. The ring counter stage 30y and the associated amplifier 31y are likewise similar in operation to the ring counter stage 30a and the amplifier 31a with the exception that the amplifier 31y includes a fixed ground conection on the conductor 35 and performs the function of terminating the free running of the ring counter circuit 30 at the end of each cycle and emits a pulse to the reader 13 over the conductor 36.

The ring counter stage 30a comprises a PNP transistor 37, such as a 2N404A, which includes a base 37a, an emitter 37b and a collector 37c. Connected to the base 37a through a capacitor 41 is the output of the preceding ring counter of the scanning circuit 15, namely: the ring counter stage 30y. The collector 37c of the transistor 37 has a collector load resistor 38 connected thereto. Across the collector load resistor 38 is an output conductor 38' for the ring counter stage 30a, which is connected to the input of the succeeding ring counter stage, namely: the ring counter stage 30b.

The associated character amplifier 31a includes a NPN transistor 39, such as a 2N130 transistor, which has a base 39a, an emitter 39b and a collector 39c. Connected to the base 39a of the transistor 39 is the output of the reader 13 over the conductor 26, and the collector 37c of the transistor 37 through a resistor 40. Connected to the collector 39c is the code translator 16. The emitter 39b is connected to the power supply 22.

When the output of the amplifier 31a is positive as taken from the lead connected to the collector 39c thereof, no character signal is transmitted to the code translator 16. On the other hand, a negative potential on the output of the amplifier 39 taken from the lead connected to the collector 39c thereof causes a pulse or signal to be transferred to the code translator 16 that is representative of the character associated with the amplifier 31a.

For obtaining a negative potential from the collector 39c of the transistor 39, a positive or zero potential must be impressed on the base 39c through the conductor 26a to drive the base 39a toward a more positive potential than appears on the emitter 39b from the power supply 22. Further, the transistor 37 of the ring counter stage 30a must be conducting. Toward this end, as the preceding ring counter stage 30y becomes non-conducting, the negative slope of the trailing edge of the pulse transmitted therefrom is capacitively coupled to the base 37a of the transistor 37 of the ring counter stage 30a through the capacitor 41 to render the transistor 37 conductive. When the transistor 37 conducts, the collector 37c thereof goes toward a positive potential. As a consequence thereof, the base 39a of the transistor 39 becomes more positive with respect to the emitter 39b. This results from both resistors 40 and 42 having a positive potential applied thereto with respect to the emitter voltage of the transistor 39.

In view of the foregoing, it is apparent that the amplifier 31a conducts to transfer a negative voltage signal representative of its associated character when the ring counter stage 30a conducts and when a ground potential is applied to the input thereof over the conductor 26a.

The transistor 37 continues to conduct until a negative pulse is transmitted through a capacitor 49. When this occurs, the emitter 37b is driven more negative than the base 37a and the transistor 37 is reset and non-conductive As a consequence thereof, the negative going collector 37c is coupled through the collector lead 38' for triggering the input of the succeeding ring counter stage 30b.

If the transistor 37 of the ring counter stage 30a is not conductive, the collector 37c thereof will be negative to prevent the output of the amplifier 31a from emitting a negative pulse or signal. Likewise, if the potential or the conductor 26a is negative, the collector output of the transistor 39 will not emit a negative pulse or signal, after the negative pulse is applied to the base 37a through the capacitor 41, the stepped voltage applied to the base 37a is discharged through a resistor 44, which is connected to the power supply 22.

In FIG. 8 is shown the one-shot multivibrator circuit 33, which comprises a normally non-conducting PNP transistor 45, such as a 2N404A transistor, and a normally conducting PNP transistor 46, such as a 2N404A transistor. The transistor 45 includes a base 45a, an emitter 45b and a collector 45c. Similarly, the transistor 46 includes a base 46a, an emitter 46b and a collector 46c. The base 45a of the transistor 45 receives input signals from the reader 13 over the conductor 27 and from the punch machine 18 through a capacitor 47. The output of the collector 45c of the transistor 45 is connected to the input of the base 46*a* of the transistor 46 through a capacitor 48. The collector 46*c* of the transistor 46 is connected to the ring counter stage 30*y* through the capacitor 49.

When the transistor 46 is conducting, the transistor 45 is rendered non-conductive. Conversely, when the transistor 45 is conducting, the transistor 46 is rendered non-conductive. Normally, the transistor 45 is non-conducting and the transistor 46 is conducting.

When a negative pulse is transmitted by the reader 13 over the conductor 27 through the capacitor 47 for application on the base 45*a* of the transistor 45, the transistor 45 is rendered conductive and the transistor 46 is rendered non-conductive. As a consequence thereof, a negative pulse is emitted from the collector lead of the transistor 46 through the capacitor 49 to reset any conducting ring counter stage for starting the cycling of the free running ring counter circuit 30. After the negative pulse is emitted from the one-shot multivibrator 33, the transistor 45 returns to its normally non-conducting state and the transistor 46 returns to its normally conducting state.

Illustrated in FIGS. 2–4 is the code translator 16, which is employed in the code translating system of the present invention. The code translator 16 forms a matrix which comprises twenty-four vertical input conductors 50*a*–50*x* and eight horizontal output conductors 51*a*–51*h*. The input conductors 50*a*–50*x* of the code translator 16 are connected to the output of the amplifiers 31*a*–31*x*, respectively, of the scanning circuit 15 over the conductors 53*a*–53*x*, respectively.

It is the purpose of the code translator 16 to receive the voltage signals from the amplifiers 31*a*–31*x* of the scanning circuit 15 representative of the coded information sensed from the tape 12 and translate the same into a code compatible with the converter 20 by selectively operating the punch drive amplifier 17.

In the preferred embodiment of the present invention, the converter 20 (FIG. 4) is a Ramac 305 Computer manufactured by International Business Machines Corporation. Toward translating the phonetic intelligence into a code compatible with the converter 20, diodes, such as diodes 55*a*–55*c*, 56, 57, 58*a*–58*c*, . . . 78 are arranged in a predetermined order and sequence within the matrix of the code translator 16 as viewed in FIGS. 2–4.

Connected to the output conductors 51*a*–51*g* of the code translator 16 are punch drive amplifier circuits 17*a*–17*h*, respectively, (FIG. 4) of the punch drive amplifier 17. In series with the punch drive amplifier circuits 17*a*–17*h* are connected solenoids 18*a*–18*h*, respectively, of the punch machine 18 (FIG. 4).

When a character amplifier, such as the amplifier 31*a*, transmits a signal representative of a predetermined character to the code translator 16 (FIGS. 2–4) over a vertical input conductor, such as the conductor 50*a*, all diode coupled, horizontal output conductors, such as output conductors 51*a*, 51*b* and 51*d* that are coupled respectively by the diodes 55*a*–55*c*, will have voltage signals impressed thereon. These voltage signals are amplified by the punch drive amplifier circuits, such as the punch drive amplifiers 17*a*, 17*b* and 17*d*, to a magnitude adequate for energizing the respective solenoids connected thereto, such as the solenoids 18*a*, 18*b* and 18*d*. As a consequence thereof, the punch machine 18 will perforate or code the tape 19 in a manner recongnizable and useable by the converter 20. The coded intelligence perforated on the tape 19 will appear in the same order and in the same sequence as the phonetic code intelligence is received by the translator 16.

The tape 19 is fed to the converter 20, which in turn controls the operation of the printer 21 to produce printed copies of readable and complete words and sentences transcribed from the phonetic intelligence appearing on the tape 12. In the preferred embodiment, the printer is the 370 model manufactured by the International Business Machines Corporation.

Figure 9:
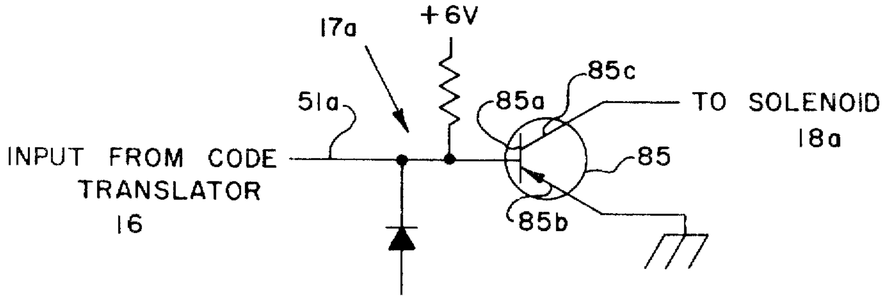
FIG. 9 is a schematic diagram of a punch drive amplifier employed in the code translating system of the present invention.

A typical punch drive amplifier, such as punch drive amplifier 17*a* is shown in FIG. 9. The amplifier 17*a* comprises a PNP transistor 85, such as a transistor 2N404A, which includes a base 85*a*, an emitter 85*b* and a collector 85*c*. The base 85*c* is connected to the output conductor 51*a* of the code translator 16. Connected to the collector 85*c* is the solenoid 18*a*. The emitter 85*b* is connected to ground. Normally, the transistor 85 is at cut-off and is non-conducting. When a negative pulse is transmitted over the conductor 51*a*, the transistor 85 conducts to energize the solenoid 18*a* of the punch machine 18.

In the operation of the code translating system 10, an operator manually activates the keyboard of the stenograph 11 (FIGS. 1 and 2) and produces phonetic code intelligence on the tape 12. An example of this is shown in FIG. 6 wherein the first horizontal line of the tape 12 represents the first cycle of operation of the present system and wherein the characters appear from left to right in the sequence that they are printed by the stenograph 11 onto the tape 12.

For transcribing the recorded phonetic code intelligence on the tape 12 to produce printed copy therefrom of completely spelled words and fully formed sentences, the operator places the tape 12 into the reader 13 (FIGS. 1 and 2), which steps the tape 12 until the first horizontal line of phonetic code characters are aligned with the transversely disposed photocells, not shown, thereof.

At this time, the readers 13 transmits a pulse over the conductor 27 to the one-shot multivibrator 33 (FIG. 4) to indicate that the tape has been advanced to the first horizontal row of characters. Thereupon, the reader 13 transmits simultaneously twenty-four voltage signals to the amplifiers 31*a*–31*x* of the scanning circuit 15 that are representative of the phonetic coded intelligence appearing on the first horizontal line of the tape 12.

The twenty-four voltage signals are transmitted over the conductors 26*a*–26*x*, respectively, to the amplifiers 31*a*–31*x*, respectively. As shown in FIG. 6, the first horizontal line on the tape 12 has printed thereon the following characters: H A PB D. Accordingly, a positive voltage or a ground potential appears on the conductors 26*g*, 26*i*, 26*p*, 26*q* and 26*v*, and also on the input circuits of the amplifiers 31*g*, 31*i*, 31*p*, 31*q* and 31*v*. The remaining conductors 26*a*–26*f*, 26*h*, 26*j*–26*o*, 26*r*–26*u*, 26*w* and 26*x* and the remaining amplifiers 31*a*–31*f*, 31*h*, 31*j*–31*o*, 31*r*–31*u*, 31*w* and 31*x* will continue to have impressed thereon the negative potential.

The cyling of the ring counter circuit 30 commences with the cycle starting amplifier 31*y*, which has the fixed ground on the input circuit thereof. When the one-shot multivibrator circuit 33 receives the ready pulse from the reader 13 over the conductor 27, the one-shot multivibrator circuit 33 emits a release pulse to the ring counter stage 30*y* over a conductor 80 (FIGS. 4 and 8) to initiate the free running of the ring counter circuit 30.

As previously expressed, the amplifiers 31*a*–31*f* have a negative potential applied to the input circuits thereof and the amplifier 31*g*, which represents the character H, has a positive or a ground potential impressed on the input circuit thereof. Therefore, the ring counter circuit 30 free runs through the ring counter stages 30*a*–30*f* in succession with one stage conducting at a time. However, when the ring counter stage 30*g* conducts or is rendered positive, the ring counter circuit 30 stops running, since the ring counter stage 30*g* is connected to the amplifier 31*g* in a manner previously described.

At this time, the amplifier 31*g* transmits a voltage signal, which is representative of the phonetic code character H, over the conductor 53*g* to the vertical matrix input conductor 50*g* of the code translator 16. As a consequence thereof, a voltage is impressed on the horizontal output conductor 51*c* of the code translator 16 through the diode 61. Thereupon the punch drive amplifier stage 17*c* increases the voltage signal to a sufficient magnitude for energizing the solenoid 18c of the punch machine 18. This action causes the punch machine 18 to perforate the tape 19 and produce thereby a code compatible to the converter 20 and equivalent in intelligence to the phonetic code character H.

The tape 19 is fed to the converter 20 (FIG. 4), which controls the operation of the printer 21 to produce printed copy of words transcribed from the phonetic character H.

At the time the punch machine 18 is operated, a pulse is produced, which is transmitted to the one-shot multivibrator 33 over a conductor 81 (FIGS. 4 and 8). The multivibrator 33, in turn, produces a pulse to reset the ring circuit stage 30g, which pulse is transmitted over the conductor 80. As a result thereof, the ring counter circuit 30 is again free running.

The ring counter circuit 30 will free run through the stage 30h thereof. However, when the ring counter stage 30i conducts, the ring counter circuit 30 stops. This is because the amplifier 31i, which represents the character A, has a ground or positive potential on the input circuit thereof. As a result, the amplifier 31i transmits over the conductor 53i a voltage signal to the vertical input conductor 50i of the matrix of the code translator 16. The voltage signal is representative of the phonetic code character A.

Thereupon, voltage signals are applied to the horizontal output conductors 51a, 51c and 51e of the code translator 16 through the diodes 63a–63c, respectively. The amplifier circuits 17a, 17c and 17e amplify the voltage signals to a sufficient magnitude to energize the solenoids 18a, 18c and 18e of the punch machine 18. This results in the perforation of the tape 19 of a coded intelligence translated from the ponetic character A and compatible with the converter 20. Such perforations will appear on the tape 19 after the coded perforation translation of the phonetic character H. The tape 19 is fed to the converter 20, which, in turn, controls the operation of the printer 21 in a maner previously described to produce printed copy of words and sentence structure transcribed from the phonetic character A.

When the punch machine 18 is operated, a pulse is produced, which is transmitted to the one-shot multivibrator 33 over the conductor 81. The multivibrator 33, in turn, produces a pulse to reset the ring counter stage 30i, which pulse is transmitted over the conductor 80. As a result thereof, the ring counter circuit 30 is again free running.

The ring counter circuit 30 will free run through the stages 30j–30o thereof. However, when the ring counter stage 30p conducts, the ring counter circuit 30 stops. This is because the amplifier 31p, which represents the character P, has a ground or positive potential on the input circuit thereof. As a result thereof, the amplifier 31p transmits over the conductor 53p a voltage signal to the vertical input conductor 50p of the matrix of the code translator 16. The voltage signal is representative of the phonetic code character P.

Thereupon, voltage signals are applied to the horizontal output conductors 51a–51c of the code translator 16 through the diodes 70a–70c, respectively. The amplifier circuits 17a–17c amplify the voltage signals to a sufficient magnitude to energize the solenoids 18a–18c of the punch machine 18. This results in the perforation of the tape 19 of a coded intelligence translated from the phonetic character P compatible with the converter 20. Such perforations will appear on the tape 19 after the coded perforation translation of the phonetic character A.

The tape 19 is fed to the converter 20, which, in turn, controls the operation of the printer 21 in a manner previously described to produce printed copy of words and sentence structure transcribed from the phonetic character P. When the punch machine 18 is operated, a pulse is produced, which is transmitted to the one-shot multivibrator 33 over the conductor 81. The multivibrator

33, in turn, produces a pulse to reset the ring counter stage 30p, which pulse is transmitted over the conductor 80. As a result thereof, the ring counter circuit 30 is again free running.

The ring counter circuit 30 now stops when the next ring counter stage 30q conducts. As previously stated, the amplifier 31q, which represents the character B, has a ground or a positive potential on the input circuit thereof. Consequently, the amplifier 31q transmits over the conductor 53q a voltage signal to the vertical input conductor 50q of the code translator 16. The voltage signal is representative of the phonetic code character B.

Thereupon, voltage signals are applied to the horizontal output conductors 51b, 51f and 51g of the code translator 16 through the diodes 71a–71c, respectively. The amplifier circuits 17b, 17f and 17g amplify the voltage signals to a sufficient magnitude to energize the solenoids 18b, 18f and 18g of the punch machine 18.

This results in the perforation of the tape 19 of a coded intelligence translated from the phonetic character B and compatible with the converter 20. Such perforations will appear on the tape 19 after the coded perforation translation of the phonetic code character P. The tape 19 is fed to the converter 20, which, in turn, controls the operation of printer 21, in a manner previously described to produce printed copy of words and sentence structure transcribed from the phonetic character B.

When the punch machine 18 is operated, a pulse is produced, which is transmitted to the one-shot multivibrator 33 over the conductor 81. The multivibrator 33, in turn, produces a pulse to reset the ring counter stage 30q, which pulse is transmitted over the conductor 80. As a result thereof, the ring counter circuit 30 is again free running.

The ring counter circuit 30 will free run through the stages 30r–30u thereof. However, when the ring counter stage 30v conducts, the ring counter circuit 30 stops. This is because the amplifier 31v, which represents the character D, has a ground or a positive potential on the input circuit thereof. As a result thereof, the amplifier 31v transmits over the conductor 53v a voltage signal to the vertical input conductor 50v of the code translator 16. The voltage signal is representative of the phonetic code character D.

Thereupon, voltage signals are applied to the horizontal output conductors 51c, 51f and 51g of the code translator 16 through the diodes 76a–76c, respectively. The amplifier circuits 17c, 17f and 17g amplify the voltage signals to a sufficient magnitude to energize the solenoids 18c, 18f and 18g of the punch machine 18. This results in the perforation of the tape 19 of a coded intelligence translated from the phonetic character D compatible with the converter 20. Such perforations will appear on the tape 19 after the coded perforation translation of the phonetic character B.

From the foregoing, it is to be observed that the scanning circuit 30 caused voltage signals representative of phonetic code characters to be transmitted to the code translator 16 in the same sequence and in the same order as the phonetic code characters appear on the tape 12. Accordingly, the tape 19 is perforated to code intelligence translated from the phonetic code characters and the translated code characters on the tape 19 appear in the same sequence and in the same order as the phonetic code characters appear on the tape 12.

The tape 19 is fed to the converter 20, which, in turn, controls the operation of the printer 21 in a manner previously described to produce words and sentence structure transcribed from the phonetic character D. When the punch machine 18 is operated, a pulse is produced which is transmitted to the one-shot multivibrator 33 over the conductor 81. The multivibrator 33, in turn, produces a pulse to reset the ring counter stage 30v, which pulse is transmitted over the conductor 80.

As a result thereof, the ring counter circuit 30 is again free running. The ring counter circuit 30 will free run through the stages 30$w$ and 30$x$ thereof. However, when the ring counter stage 30$y$ conducts, the ring counter 30 stops. This is because the cycle starting amplifier 31$y$ has a fixed ground or a positive potential on the input circuit thereof. This action causes the cycle start amplifier 31$y$ to transmit a tape advance pulse over the conductor 36 to the reader 13. Upon receiving this pulse, the reader 13 advances the tape 12 to the succeeding horizontal line of phonetic characters. Thereupon, the reader 13 transmits a ready pulse to the one-shot multivibrator 33 over the conductor 27. The one-shot multivibrator 33, in turn, resets the ring counter stage 30$y$ and once again the ring counter circuit 30 is free running. The second cycle now commences and the foregoing operations are repeated.

It is to be understood that variations and modifications of the invention disclosed herein may be resorted to without departing from the spirit of the invention and the scope of the appended claims.

Having thus described our invention, what we claim as new and desire to protect by Letters Patent is:

1. Apparatus for transcribing copy of complete words from a tape having character code intelligence thereon comprising a photoelectric reader code sensing device for sensing characters on said tape to produce simultaneously a plurality of signals representative of characters on said tape, a circuit connected to said sensing device to receive said simultaneously produced signals for producing in sequence signals representative of the characters sensed by said device in the same order as the characters appear on said tape, and means responsive to said signals in sequence for printing copy transcribed from the character intelligence on said tape.

2. Apparatus for transcribing copy of complete words from a tape having character code intelligence thereon comprising a photoelectric reader code sensing device for sensing characters on said tape to produce simultaneously a plurality of signals representative of characters on said tape, a scanning circuit connected to said sensing device to receive said simultaneously produced signals for producing in succession signals representative of the characters sensed by said device in the same sequence as the characters appear on said tape, a code translating circuit connected to said scanning circuit for translating said successive signals into signals compatible with a predetermined code, and means responsive to said compatible code signals for printing copy transcribed from the character intelligence on said tape.

3. Apparatus for transcribing copy of complete words from a tape having character code intelligence thereon comprising a photoelectric reader code sensing device for sensing characters on said tape to produce simultaneously a plurality of signals representative of characters on said tape, a scanning circuit connected to said sensing device to receive said simultaneously produced signals for producing in succession signals representative of the characters sensed by said device in the same order as the characters appear on said tape, a code translating circuit connected to said scanning circuit for translating said successive signals into signals compatible with a predetermined code, means responsive to said compatible code signals for recording in said predetermined code said compatible signals, and means responsive to the recorded predetermined code for printing copy transcribed from the character intelligence on said tape.

4. Apparatus for transcribing copy of complete words from a tape having character code intelligence thereon comprising a photoelectric reader for sensing simultaneously a plurality of characters for detecting the presence or absence of each of said characters individually and producing simultaneously in the output thereof signals representative of either the presence or absence of each of said characters respectively, a circuit connected to the output of said reader to receive said simultaneously produced respective signals for producing in succession signals representative of the characters appearing on said tape in the same sequence as the characters appear on said tape, and means responsive to said successive signals for printing copy transcribed from the character intelligence on said tape.

5. Apparatus for transcribing copy of complete words from a photoelectric tape having character code intelligence thereon comprising a reader for sensing simultaneously a plurality of characters for detecting the presence or absence of each of said characters individually to produce simultaneously in the output thereof signals representative of either the presence or absence of each of said characters respectively, a plurality of character amplifiers connected to said reader, there being a character amplifier for each of said characters, each of said character amplifiers being responsive to the signal representative of its associated character, a circuit connected to said character amplifiers for controlling the operation of said character amplifiers to produce in succession signals representative of the characters appearing on said tape in the same sequence as the characters appear on said tape, and means connected to said character amplifiers and responsive to said successive signals for printing copy transcribed from the character intelligence on said tape.

6. Apparatus for transcribing copy of complete words from a tape having character code intelligence thereon comprising a reader for sensing simultaneously a plurality of characters for detecting the presence or absence of each of said characters individually to produce simultaneously in the output thereof signals representative of either the presence or absence of each of said characters respectively, a plurality of character amplifiers connected to said reader, there being a character amplifier for each of said characters, means interconnecting said character amplifiers with said reader to impress on each of said character amplifiers respectively a voltage signal representative of the presence or absence of its associated character, a ring counter stage for each of said character amplifiers, means interconnecting said ring counter stages to render said ring counter stages conductive one at a time and in a predetermined sequence, means interconnecting said ring counter stages and said character amplifiers for controlling the operation of said character amplifiers to produce in succession signals representative of the characters appearing on said tape in the same sequence as the characters appear on said tape, and means connected to said character amplifiers and responsive to said successive signals for printing copy transcribed from the character intelligence on said tape.

7. Apparatus for transcribing copy of complete words from a tape having character code intelligence thereon comprising a reader for sensing simultaneously a plurality of characters for detecting the presence or absence of each of said characters individually during a cycle of operation to produce simultaneously in the output thereof during each cycle of operation signals representative of either the presence or the absence of each of said characters respectively, a plurality of character amplifiers connected to said reader, there being a character amplifier for each of said characters, means interconnecting said character amplifiers with said reader to impress on each of said character amplifiers respectively a voltage signal representative of the presence or the absence of its associated character, a ring counter stage for each of said character amplifiers, means interconnecting said ring counter stages for rendering said ring counter stages free running in a predetermined sequence, means interconnecting said ring counter stages and said character amplifiers for controlling the operation of said character amplifiers during each cycle to produce in succession signals representatitve of the characters appearing on said tape in the same sequence as the characters appear on said tape, means connected to said character amplifiers and responsive to said successive signals for printing copy transcribed from the character intelligence on said tape, circuit means connected to said ring counter stages to stop the free running thereof at the end of each cycle of operation and for transmitting a tape advancing signal to said reader, and means interconnecting said reader and said circuit means for starting the free running of said ring counter stages at the beginning of each cycle of operation in response to a ready signal received from said reader.

8. Apparatus for transcribing copy of complete words from a tape having character code intelligence thereon comprising a reader for sensing simultaneously a plurality of characters for detecting the presence or the absence of each of said characters individually to produce simultaneously in the output thereof signals representative of either the presence or the absence of each of said characters respectively, a plurality of character amplifiers connected to said reader, there being a character amplifier for each of said characters, means interconnecting said character amplifiers with said reader to impress on each of said character amplifiers respectively a voltage signal representative of the presence or the absence of its associated character, a ring counter stage for each of said character amplifiers, means interconnecting said ring counter stages for rendering said ring counter stages free running in a predetermined sequence, means interconnecting said ring counter stages and said character amplifiers for controlling the operation of said character amplifiers to transmit in succession signals representative of the characters appearing on said tape in the same sequence as the characters appear on said tape and for stopping the free running of said ring counter stages in response to the transmission by a character amplifier of a signal representative of a character appearing on said tape, a code translating circuit connected to said character amplifiers for translating said successive signals into signals compatible with a predetermined code, means responsive to said compatible code signals for printing copy transcribed from the character intelligence on said tape and for producing a scan advance signal for each translated character, and means connected to said ring counter stages and responsive to a scan advance signal for starting the free running of said ring counter stages.

9. Apparatus for transcribing copy of complete words from a tape having character code intelligence thereon comprising a reader for sensing simultaneously a plurality of characters for detecting the presence or the absence of each of said characters individually during a cycle of operation to produce simultaneously in the output thereof during each cycle of operation signals representative of either the presence or absence of each of said characters respectively, a plurality of character amplifiers connected to said reader, there being a character amplifier for each of said characters, means interconnecting said character amplifiers with said reader to impress on each of said character amplifiers respectively a voltage signal representative of the presence or the absence of its associated character, a ring counter stage for each of said character amplifiers, means interconnecting said ring counter stages for rendering said ring counter stages free running in a predetermined sequence, means interconnecting said ring counter stages and said character amplifiers for controlling the operation of said character amplifiers during each cycle to produce in succession signals representative of the characters appearing on said tape in the same sequence as the characters appear on said tape and for stopping the free running of said ring counter stages in response to the transmission by a character amplifier of a signal representative of a character appearing on said tape, circuit means connected to said ring counter stages to stop the free running thereof at the end of each cycle of operation and for transmitting a tape advance signal to said reader, scan advancing means interconnecting said reader, said ring counter stages and said circuit means for starting the free running of said ring counter stages at the beginning of each cycle of operation in response to a ready signal received from said reader, a code translating circuit connected to said character amplifiers for translating said successive signals into signals compatible with a predetermined code, and means responsive to said compatible code signals for printing copy transcribed from the character intelligence on said tape and connected to said scan advancing means for activating the scan advancing means to start the free running of said ring counter stages in response to the receipt of a compatible code signal.

10. Apparatus for transcribing copy of complete words from a tape having character code intelligence printed thereon comprising a reader for sensing a row of characters on said tape to produce simultaneously a plurality of signals representative of the characters on said tape, a free running scanning circuit connected to said reader to receive said simultaneously produced signals for producing in sequence signals representative of the characters sensed by said reader in the same order as the characters appear in the row on said tape, means connected to said free running scanner circuit to stop the scanning thereof at the completion of the row and to transmit to said reader a tape advance signal, and means responsive to said signals in sequence for printing copy transcribed from the character intelligence on said tape.

11. Apparatus for transcribing copy of complete words from a tape having character code intelligence printed thereon comprising a reader for sensing a row of characters on said tape to produce simultaneously a plurality of signals representative of the characters on said tape, a free running scanning circuit connected to said reader to receive said simultaneously produced signals for producing in sequence signals representative of the characters sensed by said reader in the same order as the characters appear in the row on said tape, circuit means connected to said free running scanning circuit to stop the running thereof at the completion of the row and to transmit to said reader a tape advance signal, means responsive to a ready signal received from said reader for resetting said circuit means to start the free running of said scanning circuit, and means responsive to said signals in sequence for printing copy transcribed from the character intelligence on said tape.

12. Apparatus for transcribing copy of complete words from a tape having character code intelligence printed thereon comprising a reader for sensing a row of characters on said tape to produce simultaneously a plurality of signals representative of the characters on said tape, a free running scanning circuit connected to said reader to receive said simultaneously produced signals for producing in succession signals representative of the characters sensed by said reader in the same order as the characters appear in the row on said tape, said scanning circuit stops its free running each time a successive signal is produced, a translating circuit connected to said scanning circuit for translating said successive signals into signals compatible with a predetermined code, means responsive to said compatible code signals for printing copy transcribed from the character intelligence on said tape and for producing a scan advance signal, and means connected to said scanning circuit and responsive to said scan advance signal for starting the free running of said scanning circuit.

13. Apparatus for transcribing copy of complete words from a tape having character code intelligence printed thereon comprising a reader for sensing a row of characters on said tape to produce simultaneously a plurality of signals representative of the characters on said tape, a free running scanning circuit connected to said reader to receive said simultaneously produced signals for producing in succession signals representative of the characters sensed by said reader in the same order as the characters appear in the row on said tape, said scanning circuit stops its free running each time a successive signal is produced, translating circuit connected to said scanning circuit for translating said successive signals into signals compatible with a predetermined code, means responsive to said compatible code signals for printing copy transcribed from the character intelligence on said tape and for producing a scan advance signal, means connected to said free running scanning circuit to stop the running thereof at the completion of the row and to transmit to said reader a tape advance signal, and means connected to said scanning circuit and responsive to said scan advance signal and responsive to a ready signal received from said reader for starting the free running of said scanning circuit.

14. Apparatus comprising a photoelectric reader to sense characters on tape for producing simultaneously a plurality of signals representative of characters on the tape, and a scanning circuit connected to said reader to receive said simultaneously produced signals for producing in succession signals representative of the characters sensed by said reader in the same sequence as the characters appear on the tape.

15. Apparatus comprising a photoelectric reader to sense characters on tape for producing simultaneously a plurality of signals representative of characters on the tape, a scanning circuit connected to said reader to receive said simultaneously produced signals for producing in succession signals representative of the characters sensed by said reader in the same sequence as the characters appear on the tape, and a code translator connected to said scanning circuit for translating said successive signals into signals compatible with a predetermined code.

16. Apparatus comprising a photoelectric reader for sensing simultaneously a plurality of characters on a tape to detect the presence or absence of each of the characters individually and to produce simultaneously signals representative of either the presence or absence of each of the characters respectively and a scanner circuit connected to the reader to receive said simultaneously produced respective signals for producing in succession signals representative of the characters appearing on the tape in the same sequence as the characters appear on the tape.

17. Apparatus comprising a photoelectric reader for sensing simultaneously a plurality of characters on a tape for detecting the presence or absence of each of the characters individually to produce simultaneously signals representative of either the presence or absence of each of the characters respectively, a plurality of characters amplifiers connected to said reader, there being a character amplifier for each of said characters, each of said character amplifiers being responsive to the signal representative of its associated character, and a circuit connected to said character amplifiers for controlling the operation of said character amplifiers to produce in succession signals representative of the characters on the tape in the same sequence as the characters appear on the tape.

18. Apparatus comprising a reader for sensing simultaneously a plurality of characters on tape for detecting the presence or absence of each of the characters individually to produce simultaneously signals representative of either the presence or absence of each of the characters respectively, a plurality of character amplifiers connected to said reader, there being a character amplifier for each of the characters, means interconnecting said character amplifiers with said reader to impress on each of said character amplifiers respectively a voltage signal representative of the presence or absence of its associated character, a ring counter stage for each of said character amplifiers, means interconnecting said ring counter stages to render said ring counter stages conductive one at a time and in a predetermined sequence, and means interconnecting said ring counter stages and said character amplifiers for controlling the operation of said character amplifiers to produce in succession signals representative of the characters appearing on the tape in the same sequence as the characters appear on the tape.

References Cited by the Examiner

UNITED STATES PATENTS

| | | | |
|---|---|---|---|
| 3,036,291 | 5/1962 | Whittle et al. | 340—172.5 |
| 3,121,860 | 2/1964 | Shaw | 340—172.5 |
| 3,159,815 | 12/1964 | Groce | 340—146.3 |
| 3,219,976 | 11/1965 | Tucker | 340—172.5 |

ROBERT C. BAILEY, *Primary Examiner.*

R. M. RICKERT, *Assistant Examiner.*